United States Patent [19]
Valet et al.

[11] Patent Number: 5,322,868
[45] Date of Patent: Jun. 21, 1994

[54] COATING COMPOSITIONS STABILIZED AGAINST LIGHT, HEAT AND OXYGEN

[75] Inventors: Andreas Valet, Eimeldingen, Fed. Rep. of Germany; Godwin Berner, Binningen, Switzerland

[73] Assignee: Ciba-Geigy Corporation, Ardsley, N.Y.

[21] Appl. No.: 844,945

[22] Filed: Feb. 28, 1992

Related U.S. Application Data

[63] Continuation of Ser. No. 652,848, Feb. 8, 1991, abandoned.

[30] Foreign Application Priority Data

Feb. 16, 1990 [CH] Switzerland ............ 512/90
Apr. 11, 1990 [CH] Switzerland ............ 1249/90

[51] Int. Cl.$^5$ .............. C08K 5/3492; C08K 5/3415; C08K 5/3435; C08K 5/35
[52] U.S. Cl. ....................... 524/89; 524/91; 524/95; 524/99; 524/100; 524/102; 524/103; 524/115
[58] Field of Search ........... 524/100, 115, 175, 176, 524/236, 394, 398, 399, 99, 186, 316, 89, 91, 95, 102, 103; 525/340, 360

[56] References Cited

U.S. PATENT DOCUMENTS

| | | | |
|---|---|---|---|
| 4,028,300 | 6/1977 | Wake et al. | 524/100 |
| 4,444,974 | 4/1984 | Takase et al. | 528/33 |
| 4,619,956 | 10/1986 | Susi | 524/100 |
| 4,772,672 | 9/1988 | Isozaki et al. | 526/273 |
| 4,826,978 | 5/1989 | Migdal et al. | 544/216 |
| 5,064,883 | 11/1991 | Behrens et al. | 524/100 |
| 5,112,890 | 5/1992 | Behrens et al. | 524/100 |

OTHER PUBLICATIONS

Light & Heat Stabilizer for Coatings by Schirmann and Dexter in p. 256 of "Handbook of Coatings Additives" by Marcel Dekker, Inc. 1987.
Handbook of Coatings Additives, Marcel Dekker, New York p. 485.
Proc. XIII Inter. Conf. Org. Coat. Sc. Tech., (1987), p. 252.
H. Kittel (Ed), Lehrbuch der Lacke & Beschichtungen, vol. 1, Part 1 pp. 380, 382 & Part 2 pp. 635–636.

Primary Examiner—Paul R. Michl
Assistant Examiner—Tae H. Yoon
Attorney, Agent, or Firm—Luther A. R. Hall

[57] ABSTRACT o-Hydroxyphenyl-s-triazines of formula I

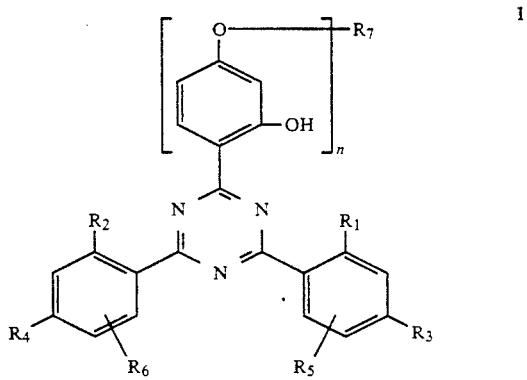

wherein n is 1 or 2 and $R_1$ to $R_7$ are as defined in claim 7, are good light stabilizers for coating compositions which contain a basic curing catalyst. In contradistinction to other UV absorbers, they do not cause discolorations in the presence of such catalysts.

29 Claims, No Drawings

COATING COMPOSITIONS STABILIZED AGAINST LIGHT, HEAT AND OXYGEN

This application is a continuation of application Ser. No. 652,848, filed Feb. 8, 1991 now abandoned.

The present invention relates to coating compositions which are stabilised against light, heat and oxygen and which contain an o-hydroxyphenyl-s-triazine derivative as stabiliser. The coating compositions to be stabilised are those which contain as curing catalyst an organometallic compound, an amine, an amino group containing resin or a phosphine.

The thermal curing of stoving varnishes which contain certain types of binders can be accelerated by catalysts, thereby making possible shorter curing times or lower curing temperatures. Depending on the type of binder, the catalysts may be acids or bases. Basic catalysts comprise organic metallic compounds such as metal chelates, metal carbonates or organometallic compounds or also amines.

If it is desired to enhance the light stability of a coating, a light stabiliser, preferably a UV absorber, will normally be added. The most widely used types of UV absorbers for coating compositions are the 2-hydroxybenzophenones and 2-(2-hydroxyphenyl)benzotriazoles. The addition of such UV absorbers to a coating composition which contains an organic metallic compound, an amine or a phosphine as curing agent, gives rise to discolourations which are evidently formed by reaction of the light stabiliser with the curing catalyst. A further deleterious effect which may be caused by the UV absorber is that the curing catalyst is blocked, so that the coating is insufficiently cured. It is probable that the aromatic hydroxyl groups of the UV absorber cause chelation of the base.

In the course of seeking UV absorbers which do not give rise to troublesome effects in such catalysed coating compositions it is now been found that certain derivatives of 2-hydroxyphenyl-s-triazine do not have the drawbacks referred to above of the other UV absorbers, although they too are good UV absorbers and although they also contain phenolic hydroxyl groups which are capable of effecting chelation.

Specifically, the present invention relates to a coating composition comprising

A) a binder,

B) as curing catalyst, an organic metallic compound and/or an amine and/or amino group containing resin and/or a phosphine, and C) as stabiliser against damage induced by light, heat and oxygen, a compound of formula I

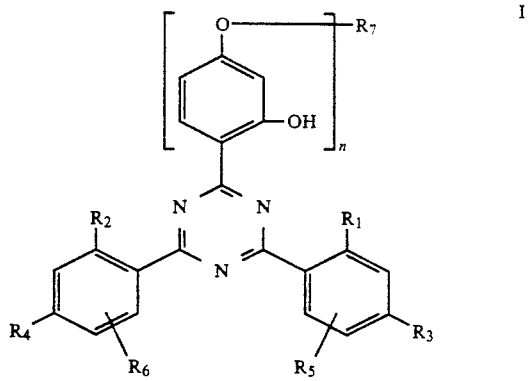

wherein n is 1 or 2, $R_1$ and $R_2$ are each independently of the other H, OH, $C_1-C_{12}$alkyl or halomethyl, $R_3$ and $R_4$ are each independently of the other H, OH, $C_1-C_{12}$alkyl, $C_1-C_{18}$alkoxy or halogen and, when $n=1$, may also be a radical $-OR_7$, $R_5$ and $R_6$ are each independently of the other H, $C_1-C_{12}$alkyl or halogen, $R_7$, when n is 1, is hydrogen, $C_1-C_{18}$alkyl, or $C_1-C_{12}$alkyl, each substituted by OH, $C_1-C_{18}$alkoxy, halogen, phenoxy or phenoxy which is substituted by $C_1-C_{18}$alkyl, $C_1-C_{18}$alkoxy or halogen, $-COOH$, $-COOR_8$, $-CONH_2$, $-CONHR_9$, $-CON(R_9)(R_{10})$, $-NH_2$, $-NHR_9$, $-N(R_9)(R_{10})$, $-NHCOR_{11}$, $-CN$ and/or $-OCOR_{11}$, or $R_7$ is $C_4-C_{20}$alkyl which is interrupted by one or more oxygen atoms and substituted by OH or $C_1-C_{12}$alkoxy, or is $C_3-C_6$alkenyl, glycidyl, $C_5-C_8$cycloalkyl, cyclohexyl which is substituted by OH, $C_1-C_4$alkyl or $-OCOR_{11}$, $C_7-C_{11}$phenylalkyl which is unsubstituted or substituted by OH, Cl or $CH_3$, or is $-CO-R_{12}$ or $-SO_2-R_{13}$, and, when n is 2, is $C_2-C_{16}$alkylene, $C_4-C_{12}$alkenylene, xylylene, $C_3-C_{20}$alkylene which is interrupted by one or more oxygen atoms and/or substituted by OH, or is a $-CH_2CH(OH)CH_2O-R_{15}-OCH_2CH(OH)CH_2-$, $-CO-R_{16}-CO-$, $-CO-NH-R_{17}-NH-CO-$ or $-(CH_2)_m-COO-R_{18}-OCO-(CH_2)_m-$group, wherein m is 1-3, $R_8$ is $C_1-C_{18}$alkyl, $C_3-C_{18}$alkenyl, $C_3-C_{20}$alkyl which is interrupted by O, N or S and/or substituted by OH, $C_1-C_4$alkyl which is substituted by $-P(O)(OR_{14})_2$, $-N(R_9)(R_{10})$ or $-OCOR_{11}$ and/or OH, or is glycidyl, cyclohexyl or $C_7-C_{11}$phenylalkyl, $R_9$ and $R_{10}$ are each independently of the other $C_1-C_{12}$alkyl, $C_3-C_{12}$alkoxyalkyl, $C_4-C_{16}$dialkylaminoalkyl or $C_5-C_{12}$cycloalkyl, or $R_9$ and $R_{10}$, when taken together, are $C_3-C_9$alkylene or $C_3-C_9$oxaalkylene or $C_3-C_9$azaalkylene, $R_{11}$ is $C_1-C_{18}$alkyl, $C_2-C_{18}$alkenyl or phenyl, $R_{12}$ is $C_1-C_{18}$alkyl, $C_2-C_{18}$alkenyl, phenyl, $C_1-C_{12}$alkoxy, phenoxy, $C_1-C_{12}$alkylamino, phenylamino, tolylamino or naphthylamino, $R_{13}$ is $C_1-C_{12}$alkyl, phenyl, naphthyl or $C_7-C_{14}$alkylphenyl, $R_{14}$ is $C_1-C_{12}$alkyl or phenyl, $R_{15}$ is $C_2-C_{10}$alkylene, phenylene or a phenylene-X-phenylene- group, wherein X is $-O-$, $-S-$, $-SO_2-$, $-CH_2-$ or $-C(CH_3)_2-$, $R_{16}$ is $C_2$–$C_{10}$alkylene, $C_2$–$C_{100}$oxaalkylene or $C_2$–$C_{10}$thiaalkylene, phenylene, naphthylene, diphenylene or $C_2$–$C_6$alkenylene, $R_{17}$ is $C_2$–$C_{10}$alkylene, phenylene, naphthylene, methylenediphenylene or $C_1$–$C_{15}$alkylphenylene, and $R_{18}$ is $C_2$–$C_{10}$alkylene or $C_4$–$C_{20}$alkylene which is interrupted by oxygen.

The binder may be any resin or mixture of resins which can be cured by organometallic compounds or amines.

Exemplary of such binders which can be base-catalysed are:

1. acrylate copolymers containing alkoxysilane or alkoxysiloxane side groups, for example the polymers disclosed in U.S. Pat. No. 4,772,672 or U.S. Pat. No. 4,444,974,
2. two component systems based on hydroxyl group containing polyacrylates and/or polyesters and aliphatic or aromatic polyisocyanates,
3. two component systems based on functional polyacrylates and a polyepoxide, said polyacrylate containing carboxyl, anhydride or amino groups,
4. two component systems based on fluoro-modified or silicon-modified hydroxyl group containing polyacrylates or polyesters and aliphatic or aromatic polyisocyanates,
5. two component systems based on (poly)ketimines and aliphatic or aromatic polyisocyanates,
6. two component systems based on (poly)ketimines and unsaturated acrylate resins or acetoacetate resins or methyl-α-acrylamidomethyl glycolate,
7. two component systems based on anhydride group containing polyacrylates and polyamines,
8. two component systems based on (poly)oxazolidines and anhydride group containing polyacrylates or unsaturated acrylate resins or polyisocyanates,
9. two component systems based on epoxy group containing polyacrylates and carboxyl group containing or amino group containing polyacrylates,
10. air-drying alkyd, acrylic or alkyd-acrylic resins,
11. polymers based on allylglycidyl ether.

Component A is preferably a binder based on a functional acrylate resin and a crosslinker.

Component B is an organic metallic compound and/or an amine and/or an amino group containing resin and/or a phosphine. Exemplary of organic metallic compounds are metal carboxylates, preferably of the metals Pb, Mn, Co, Zn, Zr or Cu, or metal chelates, preferably those of the metals Al, Ti or Zr, or organometallic compounds such as organotin compounds.

Metal carboxylates are typically the stearates of Pb, Mn or Zn, the octoates of Zn or Cu, the naphthenates of Mn and Co, or the corresponding linoleates, resinates or tallates.

Metal chelates are typically the aluminium, titanium or zirconium chelates of acetylacetone, ethyl acetylacetate, salicylaldehyde, salicylaldoxime, o-hydroxyacetophenone or ethyl trifluoroacetylacetate and the alkoxides of these metals.

Organotin compounds are typically dibutyltin oxide, dibutyltin dilaurate or dibutyltin dioctoate.

Amines are, typically, preferably tertiary amines, such as tributylamine, triethanolamine, N-methyl-diethanolamine, N-dimethylethanolamine, N-ethylmorpholine, N-methylmorpholine or diazabicyclooctane (triethylenediamine) and the salts thereof. Further examples are quaternary ammonium salts such as trimethylbenzylammonium chloride.

Amino group containing resins are simultaneously binder and curing catalyst. Typical examples are acrylate copolymers.

Phosphines may also be used as curing catalysts, for example triphenylphosphine.

The o-hydroxyphenyl-s-triazines of component C are known compounds or are disclosed in U.S. patent application Ser. No. 446,369. The use of such compounds as UV absorbers in coating compositions is disclosed, for example, in U.S. Pat. No. 4,619,956.

It is preferred to use as component C a compound of formula I, wherein n is 1 or 2, $R_1$ and $R_2$ are each independently of the other H, OH or $C_1$–$C_4$alkyl, $R_3$ and $R_4$ are each independently of the other H, OH, $C_1$–$C_4$alkyl, $C_1$–$C_4$alkoxy, halogen or a radical —$OR_7$, $R_5$ and $R_6$ are each independently of the other H or $C_1$–$C_4$alkyl, $R_7$, when n is 1, is hydrogen, $C_1$–$C_{18}$alkyl, $C_1$–$C_6$alkyl which is substituted by OH, $C_1$–$C_{18}$alkoxy, phenoxy, —$COOR_8$, —$CONHR_9$, —$CON(R_9)(R_{10})$ and/or —$OCOR_{11}$, or is allyl, glycidyl or benzyl, and, when n is 2, is $C_4$–$C_{12}$alkylene, $C_4$–$C_6$alkenylene, xylylene or $C_3$–$C_{20}$alkylene which is interrupted by oxygen and/or substituted by OH, $R_8$ is $C_1$–$C_{12}$alkyl, $C_3$–$C_{18}$alkenyl, $C_3$–$C_{20}$alkyl which is interrupted by oxygen and/or substituted by OH, or $C_1$–$C_4$alkyl which is substituted by —$P(O)(OR_{14})_2$, $R_9$ and $R_{10}$ are each independently of the other $C_1$–$C_8$alkyl or cyclohexyl, or $R_9$ and $R_{10}$, when taken together, are pentamethylene or 3-oxapentamethylene, $R_{11}$ is $C_1$–$C_8$alkyl, $C_2$–$C_5$alkenyl or phenyl, and $R_{14}$ is $C_1$–$C_4$alkyl.

It is especially preferred to use as component C a compound of formula I, wherein n is 1 or 2, $R_1$ and $R_2$ are each independently of the other H or $CH_3$, $R_3$ and $R_4$ are each independently of the other H, $CH_3$ or Cl, $R_5$ and $R_6$ are hydrogen, $R_7$, when n is 1, is hydrogen, $C_1$–$C_{12}$alkyl, $C_1$–$C_4$alkyl which is substituted by OH, $C_4$–$C_{18}$alkoxy, —$COOR_8$, —$CON(R_9)(R_9)$ and/or —$OCOR_{11}$, or is glycidyl or benzyl, and, when n is 2, is $C_6$–$C_{12}$alkylene, 2-butenyl-1,4-ene, xylylene or $C_3$–$C_{20}$alkylene which is interrupted by oxygen and/or substituted by OH, $R_8$ is $C_4$–$C_{12}$alkyl, $C_{12}$–$C_{18}$alkenyl, $C_6$–$C_{20}$alkyl which is interrupted by oxygen and/or substituted by OH, or is $C_1$–$C_4$alkyl which is substituted by —$P(O)(OR_{14})_2$, $R_9$ and $R_{10}$ are $C_4$–$C_8$alkyl, $R_{11}$ is $C_1$–$C_8$alkyl or $C_2$–$C_3$alkenyl, and $R_{14}$ is $C_1$–$C_4$alkyl.

A further group of compounds suitable for use as component C comprises those compounds wherein n is 1 or 2 and $R_7$, when n is 1, is a —$CH_2CH(OH)CH_2O$—$R_{19}$ group, wherein $R_{19}$ is $C_1$–$C_{12}$alkyl, phenyl, phenyl which is substituted by $C_1$–$C_{12}$alkyl, $C_1$–$C_{12}$alkoxy or halogen, or is $C_3$–$C_5$alkenoyl and, when n is 2, $R_7$ is a —$CH_2CH(OH)CH_2O$—$R_{15}$—$OCH_2CH(OH)CH_2$— group, wherein $R_{15}$ is $C_2$–$C_{10}$alkylene, phenylene or a -phenylene-X-phenylene-group, wherein X is —O—, —S—, —$SO_2$—, —$CH_2$— or $C(CH_3)_2$—.

Representative examples of individual compounds of formula I are the following compounds

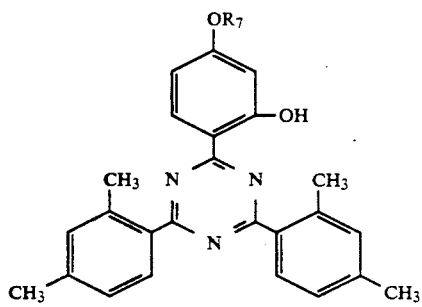

R₇ = —H
—C₂H₅
—C₄H₉
—C₈H₁₇
—C₁₂H₂₅
—C₁₈H₃₇
-cyclohexyl
—CH₂ phenyl
—CH₂CH₂OH
—CH₂CH₂OCOCH₃
—CH₂CH₂OCOCH=CH₂
—CH₂CH(OH)C₈H₁₇
—CH₂CH(OH)C₁₂H₂₅
—CH₂CH(OH)CH₂OC₈H₁₇
—CH₂CH(OH)CH₂O—(CH₂)$_{\overline{12-14}}$CH₃
—CH₂CH(OH)CH₂Ophenyl
—CH₂CH(OH)CH₂OCOC(CH₃)=CH₂

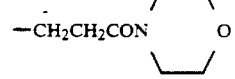

—CH₂COOH
—CH₂CH₂COOC₄H₉
—CH₂COOC₈H₁₇
—CH₂COO(CH₂CH₂O)₇H
—CH₂COOCH₂CH(OH)CH₂OC₄H₉
—CH₂COOCH₂CH(CH₃)OCH₂CH(CH₃)OCH(CH₃)CH₃
—CH₂COOCH₂P(O)(OC₂H₅)₂
—CH₂COOCH₂CH(OH)CH₂P(O)(OC₄H₉)₂
—CH₂COO(CH₂)₇CH=CHC₈H₁₇
—CH₂COOCH₂CH₂OCH₂CH₂OC₆H₁₃
—CH₂CON(C₂H₅)₂

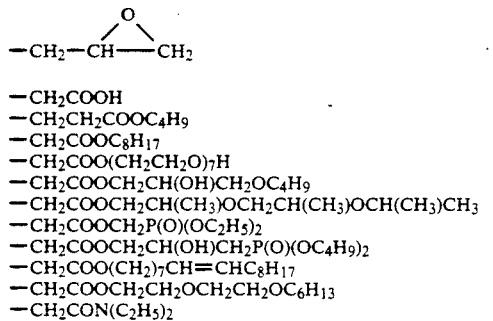

—CH₂CONHCH₂CH₂CH₂N(CH₃)₂
—CH₂CONHC₈H₁₇
—CH₂CON(C₈H₁₇)₂

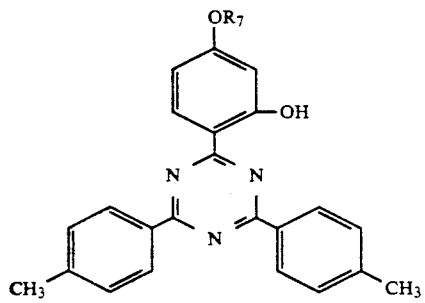

R₇ = —C₄H₉
—C₈H₁₇
—C₁₂H₂₅
—CH₂CH(OH)CH₂OC₈H₁₇
—CH₂CH(OH)CH₂O—(CH₂)$_{\overline{12-14}}$CH₃
—CH₂COOC₂H₅
—CH₂COOCH₂OCH₃
—CH₂COOCH₂CH=CH-phenyl -continued

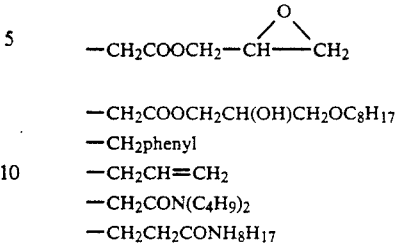

—CH₂COOCH₂CH(OH)CH₂OC₈H₁₇
—CH₂phenyl
—CH₂CH=CH₂
—CH₂CON(C₄H₉)₂
—CH₂CH₂CONH₈H₁₇

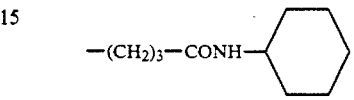

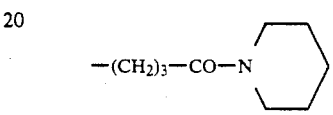

—CO—OC₆H₁₃
—CH₂CH₂Cl
—CH₂CH₂CN

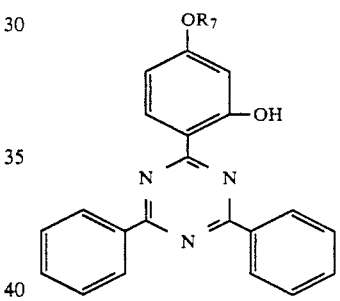

R₇ = —H
—CH₃
—C₃H₇
—C₆H₁₃
—C₈H₁₇
—C₁₂H₂₅
—CH₂CH(OH)CH₂OC₈H₁₇
—CH₂CH(OH)CH₂O—(CH₂)$_{\overline{12-14}}$CH₃
—CH₂CH(OH)phenyl
—CH₂CH(OH)CH₂OCOphenyl
—CH₂CH(CH₃)OCOCH₃
—SO₂—C₁₂H₁₅

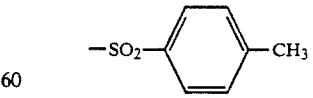

—CH₂COOC₁₀H₂₁
—CH₂CONHCH₂CH₂OCH₃
—CH₂CH₂CONHCH₂phenyl
—(CH₂)₃CONH(CH₂)₃N(C₂H₅)₂
—CH₂CONHC₁₂H₂₅

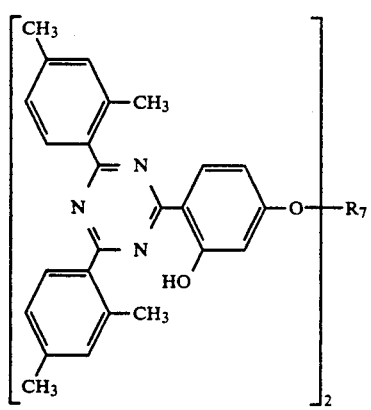

R₇ = —CH₂CH(OH)CH₂—

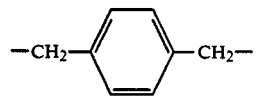

—CH₂—CH=CH—CH₂—
—(CH₂)₄—
—(CH₂)₆—
—(CH₂)₈—
—(CH₂)₁₂—
—CH₂CH(OH)CH₂O—CH₂CH₂—OCH₂CH(OH)CH₂—
—CH₂CH(OH)CH₂O—(CH₂)₆—OCH₂CH(OH)CH₂—

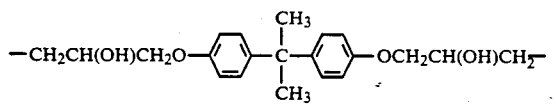

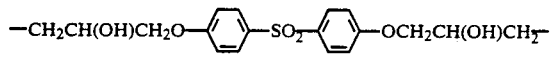

—CH₂COO—(CH₂)₆—OCOCH₂

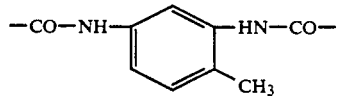

—CO—(CH₂)₈—CO—

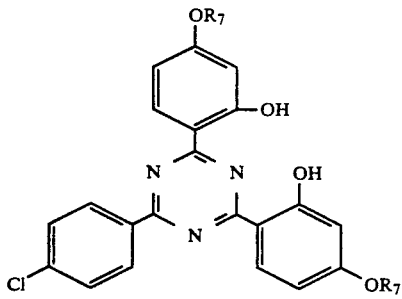

R₇ = —H
—C₄H₉
—C₈H₁₇
—C₁₈H₃₇
—CH₂CH(OH)CH₃
—CH₂CH₂OC₄H₉
—CH₂CH₂COC₂H₅
—CH₂COOC₈H₁₇
—CH₂CH(OH)CH₂OC₄H₉
—CH₂CH(OH)CH₂Ophenyl

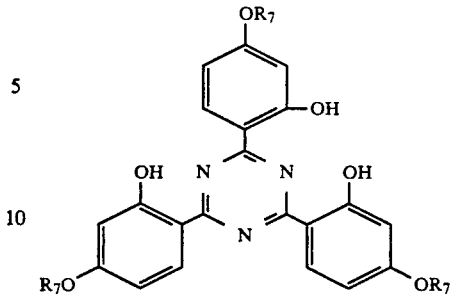

R₇ = —C₂H₅
—C₄H₉
—C₆H₁₃
—C₈H₁₇
—CH₂CH₂OH
—CH₂CH₂Ophenyl
—CH₂COOC₆H₁₃
—CH₂CH₂COO(CH₂CH₂O)₃H
—CH₂CH(OH)CH₂OC₆H₁₃
—CH₂CH(OH)CH₂phenyl The coating composition preferably contains, per 100 parts by weight of solid binder A, 0.01–20 parts by weight of curing catalyst B and 0.01–10 parts by weight of C, preferably 0.05–5 parts by weight of B and 0.2–5 parts by weight of C.

In addition to components A, B and C, the coating composition may contain further components such as solvents, pigments, dyes, plasticisers, stabilisers, thixotropic agents and/or levelling agents.

Normally the coating compositions will contain an organic solvent or mixture of solvents in which the binder is soluble. The coating composition can also, however, be an aqueous solution or dispersion. The vehicle can also be a mixture of an organic solvent and water. The coating composition can also be a high solids paint or be solvent-free (powder-coating composition).

The pigments may be inorganic, organic or metallic pigments. Preferably the coating compositions of the invention do not contain pigments and are used as clear coating compositions:

In addition of stabiliser of formula I, the coating compositions may contain further stabilisers such as antioxidants, other light stabilisers, metal deactivators, phosphites or phosphonites.

Exemplary of such additional stabilisers are:

1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol.

1.2. Alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol.

1.3. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol).

1.4. Alkylidenebisphenols, for example 2,2'-methylenebis(6-tert-butyl-4-methylphenol), 2,2'-methylenebis(6-tert-butyl-4-ethylphenol), 2,2'- methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)--4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4methylphenyl] terephthalate.

1.5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl) dithiolterephthalate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tert-butyl-4-hydroxybenzylphosphonate, 1,3,5-tris(3,5-dicyclohexyl-4-hydroxybenzyl)isocyanurate.

1.6. Acylaminophenols, for example 4-hydroxylauranilide, 4-hydroxystearanilide, 2,4-bis(octylmercapto)-6-(3,5-di-tert-butyl-4-hydroxyanilino)-s-triazine, octyl N-(3,5-di-tert-butyl-4-hydroxyphenyl)carbamate.

1.7. Esters of β-(3,5-di-tert-butyl-4-hydroxyphenyl)-propionic acid with mono- or polyhydric alcohols, e.g. with methanol, octadecanol, 1,6-hexanediol, neopentyl glycol, triethylene glycol, pentaerythritol, tris(hydroxyethyl) isocyanurate, thiodiethylene glycol, N,N'-bis(hydroxyethyl)oxalodiamide.

1.8. Esters of β-(5-tert-butyl-4-hydroxy-3-methylphenyl)propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalodiamide.

1.9. Esters of β-(3,5-dicyclohexyl-4-hydroxyphenyl)-propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalodiamide.

1.10. Amides of β-(3,5-di-tert-butyl-4-hydroxyphenyl)propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

2. UV absorbers and light stabilisers 2.1. 2-(2'-Hydroxyphenyl)benzotriazoles, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-sec- butyl-5'-tertbutyl, 4'-octoxy, 3',5'-di-tert-amyl and 3',5'-bis(α,α-dimethylbenzyl) derivative.

2.2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivative.

2.3. Esters of substituted and unsubstituted benzoic acids, for example, 4-tert-butylphenyl salicylate, phenyl salicylate, octylphenyl salicylate, dibenzoylresorcinol, bis(4-tert-butylbenzoyl)-resorcinol, benzoylresorcinol, 2,4-di-tert-butylphenyl 3,5-di-tert-butyl-4-hydroxy-benzoate and hexadecyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of 4-hydroxy-3,5-di-tert-butylbenzyl-phosphonic acid monoalkyl esters, e.g. of the methyl or ethyl ester, nickel complexes of ketoximes, e.g. of 2-hydroxy-4-methyl-phenyl undecyl ketoneoxime, nickel complexes of 1-phenyl-4-lauroyl-5-hydroxypyrazole, with or without additional ligands.

2.6. Sterically hindered amines, for example bis(2,2,6,6-tetramethylpiperidyl) sebacate, bis(1,2,2,6,6-pentamethylpiperidyl) sebacate, bis(1,2,2,6,6-pentamethylpiperidyl) n-butyl-3,5-di-tert-butyl-4-hydroxy-benzylmalonate, the condensation product of 1-(2-hydroxyethyl)-2,2,6,6-tetramethyl-4-hydroxypiperidine and succinic acid, the condensation product of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl)-nitrilotriacetate, tetrakis(2,2,6,6-tetramethyl-4-piperidyl)-1,2,3,4-butanetetraoate, 1,1'-(1,2-ethanediyl)bis-(3,3,5,5-tetramethylpiperazinone).

2.7. Oxalyl diamides, for example 4,4'-dioctyloxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butoxanilide and mixtures of ortho- and para-methoxy-disubstituted oxanilides and mixtures of o- and p-ethoxydisubstituted oxanilides.

3. Metal deactivators, for example N,N'-diphenyloxalyl diamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalic dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-ditertbutylphenyl) pentaerythritol diphosphite, tristearyl sorbitol triphosphite, tetrakis-(2,4-di-tert-butylphenyl) 4,4'-biphenylene diphosphonite, 3,9-bis(2,4-di-tert-butylphenoxy)-2,4,8,10-tetraoxa-3,9-diphosphaspiro[5.-5]undecane.

To achieve maximum light stabilisation it is particularly expedient to add the sterically hindered amines listed in 2.6 above. Accordingly, the invention also relates to a coating composition which, in addition to containing components A, B and C, contains a light stabiliser of the sterically hindered amine type as component D.

The preferred light stabiliser of component D is a 2,2,6,6-tetraalkylpiperidine derivative which contains at least one group of formula

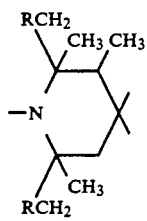

wherein R is hydrogen or methyl, preferably hydrogen.

Component D will preferably be used in an amount of 0.5-5 parts by weight per 100 parts by weight of the solid binder.

Examples of tetraalkylpiperidine derivatives will be found in EP-A-356 677, pages 3-17, paragraphs a) to f). These paragraphs of the European patent application in question are considered as being incorporated in the instant description. It is particularly preferred to use the following tetraalkylpiperidine derivatives:

bis(2,2,6,6-tetramethylpiperidin-4-yl)succinate,
bis(2,2,6,6-tetramethylpiperidin-4-yl)sebacate,
bis(1,2,2,6,6-pentamethylpiperidin-4yl)-sebacate,
bis(1,2,2,6,6-pentamethylpiperidin-4-ylbutyl(3,5-di-tert-butyl-4-hydroxybenzyl)malonate
bis(1-octyloxy-2,2,6,6-tetramethylpiperidin-4-yl)-sebacate,
tetra(2,2,6,6-tetramethylpiperidin-4-yl)butane-1,2,3,4-tetracarboxylate,
tetra(1,2,2,6,6-pentamethylpiperidin-4-yl)butane-1,2,3,4-tetracarboxylate,
2,2,4,4-tetramethyl-7-oxa-3,20-diaza-21-oxo-dispiro[5.1.11.2]-heneicosane,
8-acetyl-3-dodecyl-1,3,8-triaza-7,7,9,9-tetramethyl-spiro[4,5]-decane-2,4-dione,
or a compound of formulae

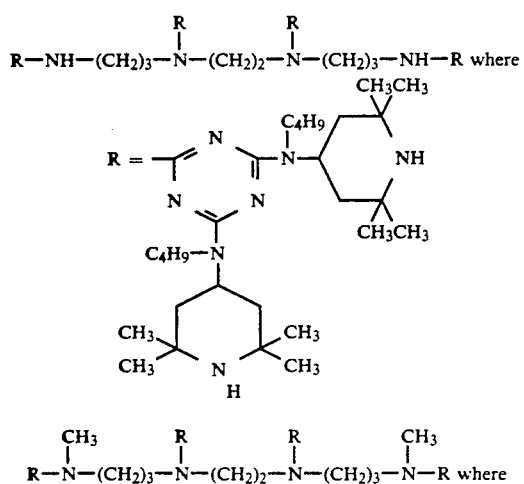

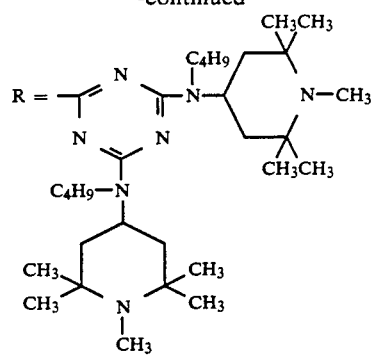

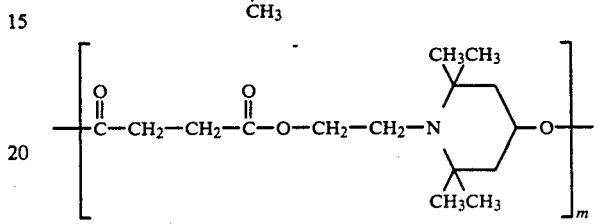

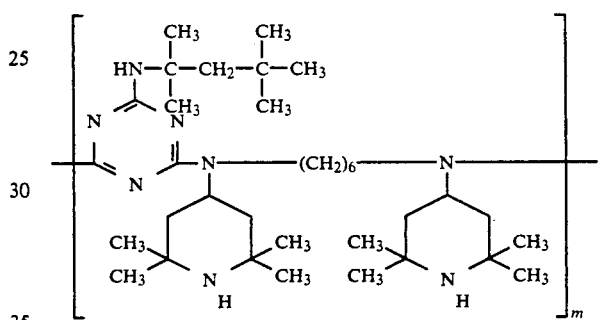

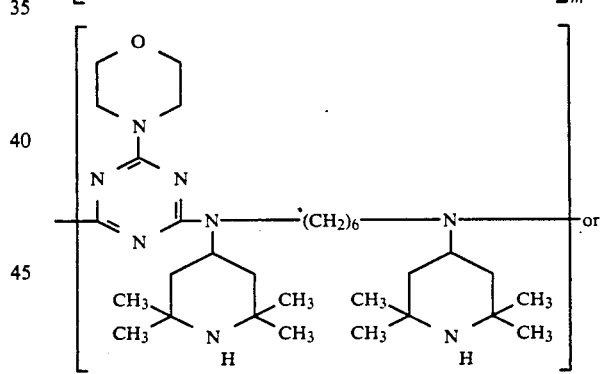

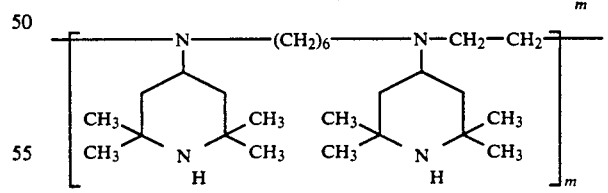

wherein m is a value from 5-50.

The coating compositions of this invention can be applied to any substrates, for example to metal, wood, plastics or ceramic materials. They are preferably used as finishing paints in the automobile industry. If the finish consists of two coats, the undercoat being pigmented and the topcoat unpigmented, then the coating composition of this invention can be used for the topcoat or for the undercoat or for both coats, but preferably for the topcoat.

The coating compositions of this invention can be applied to the substrate by conventional techniques, for example by brushing, spraying, coating, immersion or electrophoresis.

Depending on the binder systems, the finishes can be cured at room temperature or by heating. The finishes are preferably cured in the temperature range from 50°–150° C. Powder-coating compositions are also cured at higher temperatures.

The finishes obtained have excellent light stability and also enhanced thermo-oxidative resistance.

A further embodiment of the invention comprises using those binders in which a 2-hydroxyphenyl-s-triazine is incorporated by copolymerisation or copolycondensation. Suitable for this utility are those compounds of formula I wherein $R_7$ contains a copolymerisable ethylenically unsaturated group or a functional group which is suitable for copolycondensation. In this case, the coating composition may consist of only components A and B.

The following Examples illustrate the coating compositions of this invention in more detail without implying any restriction of the invention to the Examples. Parts and percentages are by weight.

The following UV absorbers of the invention are used in the Examples:

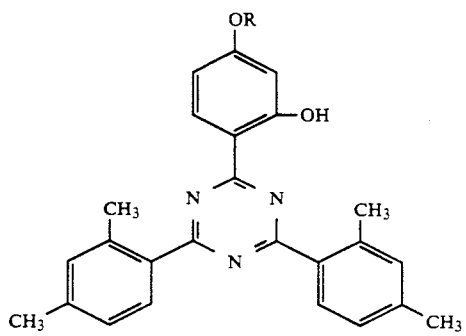

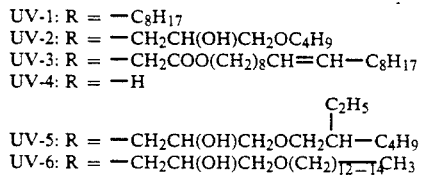

UV-1: R = —$C_8H_{17}$
UV-2: R = —$CH_2CH(OH)CH_2OC_4H_9$
UV-3: R = —$CH_2COO(CH_2)_8CH=CH—C_8H_{17}$
UV-4: R = —H
UV-5: R = —$CH_2CH(OH)CH_2OCH_2\overset{C_2H_5}{\underset{|}{CH}}—C_4H_9$
UV-6: R = —$CH_2CH(OH)CH_2O(CH_2)_{\overline{12-14}}CH_3$ In addition, the following UV absorbers are used for comparison purposes:

V-1: the reaction product of 2-[2-hydroxy-3-tert-butyl-5-(2-methoxycarbonylethyl)phenyl]benzotriazole with polyethylene glycol 300
V-2: 2-hydroxy-4-dodecycloxybenzophenone
V-3: 2,4-dihydroxybenzophenone
V-4: 2-[2-hydroxy-3,5-di(α,α-dimethylbenzyl)phenyl]-benzotriazole.

EXAMPLE 1

Two-component polyacrylate-urethane coating composition containing a combination of a metal-containing catalyst and an amine A hydroxyl group containing acrylate coating composition is prepared by mixing the following components:

| | |
|---|---|
| 75 parts | of a 60% solution of a hydroxyl group containing acrylate resin in xylene (Macrynal ® SM 510, Hoechst AG) |
| 15 parts | of butyl glycol acetate |
| 6.1 parts | of an aromatic solvent mixture (Solvesso ® 100, Esso AG) |
| 3.6 parts | of methyl isobutyl ketone |
| 0.1 part | of zink octoate (as 8% soloution in toluene) |
| 0.2 part | of a levelling agent (Byk ® 300, Byk-Chemie). |

To this composition are added 1.5 parts of a UV absorber listed in Table 1 (dissolved in 5–10 parts of xylene). This addition corresponds to 2% of UV absorber, based on binder solids (acrylate+isocyanate).

These formulations are blended with 30 parts of a trimerised diisocyanate (Desmodur ® N 75, Bayer AG) and 1.5 parts of diazabicyclooctane (corresponding to 2%, based on binder solids).

Samples of these coating formulation are applied to aluminum sheets coated with a white coil coat and cured for 30 minutes at 60° C. The coating thickness is ca. 40 μm.

The coated test pieces are exposed to weathering in a UVCON/Weather-O-Meter (Atlas Corp., UVB-313 lamps, cycle: 4 h UV light at 60° C., 4 h condensation at 50° C.). The Yellowness Index (YI) according to ASTM D 1925 is measured after 24 hours.

TABLE 1

| UV Absorber | YI after 24 h UVCON |
|---|---|
| 2% UV-1 | 1.2 |
| 2% UV-2 | 0.5 |
| 2% UV-3 | 2.3 |
| 2% V-1 | 6.5 |

EXAMPLE 2

Polyacrylate-melamine coating composition containing a metal chelate catalyst

A clear composition is prepared from:

| | |
|---|---|
| 59.2 parts | of a 50% solution of a hydroxyl group containing acrylate resin (Uracron ® 2263B, DSM Resins NV) |
| 11.6 parts | of a 90% melamine resin (Cymel ® 327, Amer. Cyanamid Corp.) |
| 19.4 parts | of xylene |
| 5.5 parts | of butyl glycol acetate |
| 3.3 parts | of butanol |
| 1.0 part | of a 1% solution in xylene of a levelling agent (Baysilon ® A, Bayer AG). |

This composition has a 40% solids content (binder). To the composition is added 0.8 part of a UV absorber listed in Table 2 (dissolved in 5–10 parts of xylene), corresponding to 2%, based on binder solids.

To this formulation are then added 1.6 parts of aluminum tris(acetylacetonate), dissolved in xylene, corresponding to 4%, based on binder solids The clear coating composition so obtained is applied with a doctor blade to aluminum sheets coated with a white coil coat. The coating is cured for 30 minutes at 130° C. The clear coating thickness is ca. 40 μm. The Yellowness Index (YI) according to ASTM D 1925 is then measured.

TABLE 2

| UV Absorber | YI after the cure |
|---|---|
| none | −1.8 |
| 2% UV-1 | −1.6 |
| 2% UV-4 | 0.9 |
| 2% V-2 | 16.8 |
| 2% V-3 | 28.6 |
| 2% V-4 | 25.6 |

EXAMPLE 3

Polyacrylate-epoxy resin coating composition containing an amine catalyst

A clear coating composition is prepared by mixing the following components:

| | |
|---|---|
| 57.5 parts | of a 50% solution of a functional acrylate resin (Ucar ® 882, Union Carbide Co.) |
| 0.3 part | of a levelling agent (Baysilon ® OL 17, Bayer AG) (20%) |
| 3.7 parts | of an aliphatic polyglycidyl ether (Ucarlink ® Crosslinker, Union Carbide Co.) |
| 3.5 parts | of n-butanol |
| 35 parts | of xylene |
| 100 | |

The clear coating composition has a ca. 33% solids content and to it are added 2% (based on solids) of diazabicyclooctane (dissolved in xylene) as accelerator and 2% (based on solids) of a UV absorber listed in Table 3.

The test formulations are diluted with xylene to a sprayable consistency and sprayed on to aluminum sheets coated with a white coil coat. The samples are air-dried for 15 minutes and then cured for 30 minutes at 70° C. The dry film thickness is ca. 40 μm. The coated test pieces are then heated for 30 minutes to 100° C. and the Yellowness Index according to ASTM D 1925 is measured.

TABLE 3

| UV Absorber | Yellowness Index |
|---|---|
| UV-1 | 1.4 |
| UV-5 | 1.3 |
| V-3 | 8.5 |

EXAMPLE 4

Polyacrylate-epoxy resin coating composition containing an amine catalyst

The procedure of Example 3 is repeated, except that the clear coating composition is applied to aluminium sheets coated with a silver metallic primer lacquer. After curing (30 minutes at 70° C.), the coated test pieces are subjected to weathering in a UVCON Weather-O-Meter with UVB 313 lamps (cycle: 8 h UV light at 70° C., 4 h condensation at 50° C.). The Yellowness Index is measured after 48 h exposure.

TABLE 4

| UV Absorber | Yellowness Index |
|---|---|
| 2% UV-1 | −0.7 |
| 2% UV-5 | −0.6 |
| V-3 | 3.9 |

EXAMPLE 5

Two-component polyacrylate coating composition containing an amino group containing resin

| Component A: | |
|---|---|
| 59 parts | of an amino group containing polyacrylate (Setalux ® AA-8402 XS 55 AKZO Resins BV) (55% solution) |
| 19 parts | of butyl acetate |
| 13.7 parts | of xylene |
| 3 parts | of 1-methoxy-1-propylacetate |
| 3 parts | of diacetone alcohol |
| 1.5 parts | of isobutanol |
| 0.5 part | of levelling agent I (Byk ® 300, Byk-Chemie GmbH) |
| 0.3 part | of levelling agent II (Baysilon ® MA, Bayer AG) |
| 100 | |

| Component B: | |
|---|---|
| 36 parts | of an epoxy group containing polyacrylate (Setalux ® AA 8501 BX 60, AKZO Resins BV) (60% solution) |
| 9 parts | of butyl acetate |
| 5 parts | of xylene |
| 50 | |

| Component C: | |
|---|---|
| 10 parts | of xylene |
| 8 parts | of diacetone alcohol |
| 7 parts | of 1-methoxy-2-propylacetate |
| 5 parts | of isobutanol |
| 30 | |

Components A, B and C are mixed to give a clear coating composition having a ca. 30% solids content.

The sample compositions are applied with a doctor blade to aluminium sheets coated with a white coil coat, and cured for 30 minutes as 60° C. The dry film thickness is ca. 30 μm. The Yellowness Index of the coated test pieces is measured after storage for 48 hours at room temperature.

TABLE 5

| UV Absorber | Yellowness Index |
|---|---|
| none | −0.7 |
| 2% UV-1 | −0.1 |
| 2% UV-2 | 0.6 |
| 2% UV-5 | 0.1 |
| 2% UV-6 | −0.1 |
| 2% V-1 | 6.5 |
| 2% V-2 | 7.1 |
| 2% V-3 | 8.3 |
| 2% V-4 | 13.0 |

EXAMPLE 6

Polyacrylate resin containing alkoxysilane groups and a metal chelate catalyst

A copolymer of 35% of methyl acrylate, 50% of 3-(trimethoxysilyl)propylmethacrylate and 15% of

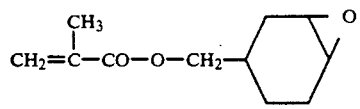

is prepared according to U.S. Pat. No. 4,772,672. The resultant resin has a molecular weight (Mw) of 21 300 and contains 0.56 mol/kg of epoxide oxygen.

The copolymer is dissolved in methyl isobutyl ketone, and 2% of UV absorber and 5% of aluminium tris(acetylacetonate) are added (in each case based on solids). The coating composition is applied with a doctor blade to aluminium sheets provided with a white coil coat and cured for 30 minutes at 130° C. The dry film thickness is ca. 18 μm. The Yellowness Index of the coated test pieces is then measured.

TABLE 6

| UV Absorber | Yellowness Index |
|---|---|
| 2% UV-5 | 2.2 |
| 2% V-2 | 6.3 |
| 2% V-3 | 7.9 |

What is claimed is:

1. A curable coating composition comprising (A) a binder based on a functional acrylate resin and a crosslinker, or a binder which is a system selected from a) an acrylate copolymer containing alkoxysilane or alkoxysiloxane side groups;

b) a two component system based on a hydroxyl group containing polyacrylate and/or polyester and an aliphatic or aromatic polyisocyanate;

c) a two component system based on a functional polyacrylate and a polyepoxide, said polyacrylate containing carboxyl or anhydride groups;

d) a two component system based on a fluoro-modified or silicon-modified hydroxyl group containing polyacrylate or polyester and an aliphatic or aromatic polyisocyanate;

e) a two component system based on a (poly)ketimine and a methyl-α-acrylamidomethyl glycolate;

f) a two component system based on an epoxy group containing polyacrylate and a carboxyl group containing polyacrylate;

g) an air-drying alkyd, acrylic or alkyd-acrylic resin; or h) a polymer based on allyl glycidyl ether;

(B) as curing catalyst, an organic metallic compound and/or an amine and/or an amino group containing resin and/or a phosphine, and (C) as stabiliser against damage induced by light, heat and oxygen, a compound of formula I

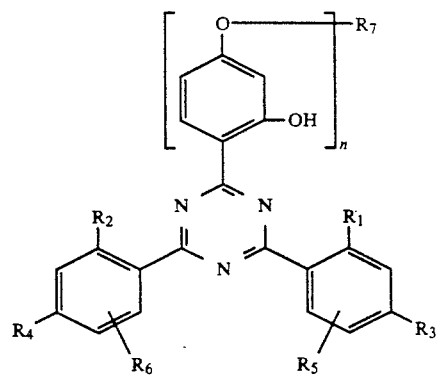

wherein n is 1 or 2, $R_1$ and $R_2$ are each independently of the other H, OH, $C_1$-$C_{12}$alkyl or halomethyl, $R_3$ and $R_4$ are each independently of the other H, OH, $C_1$-$C_{12}$alkyl, $C_1$-$C_{18}$alkoxy or halogen and, when n=1, may also be a radical —$OR_7$, $R_5$ and $R_6$ are each independently of the other H, $C_1$-$C_{12}$alkyl or halogen, $R_7$, when n is 1, is hydrogen, $C_1$-$C_{18}$alkyl or $C_1$-$C_{12}$alkyl which is substituted by OH, $C_1$-$C_{18}$alkoxy, halogen, phenoxy or phenoxy which is substituted by $C_1$-$C_{18}$alkyl, $C_1$-$C_{18}$alkoxy or halogen, —COOH, —$COOR_8$, —$CONH_2$, —$CONHR_9$, —$CON(R_9)(R_{10})$, —$NH_2$, —$NHR_9$, —$N(R_9)(R_{10})$, —$NHCOR_{11}$, —CN and/or —$OCOR_{11}$, or $R_7$ is $C_4$-$C_{20}$alkyl which is interrupted by one or more oxygen atoms and substituted by OH or $C_1$-$C_{12}$alkoxy, or is $C_3$-$C_6$alkenyl, glycidyl, $C_5$-$C_8$cycloalkyl, cyclohexyl which is substituted by OH, $C_1$-$C_4$alkyl or —$OCOR_{11}$, $C_7$-$C_{11}$phenylalkyl which is unsubstituted or substituted by OH, Cl or $CH_3$, or is —CO—$R_{12}$ or —$SO_2$—$R_{13}$, and, when n is 2, is $C_2$-$C_{16}$alkylene, $C_4$-$C_{12}$alkenylene, xylylene, $C_3$-$C_{20}$alkylene which is interrupted by one or more oxygen atoms and/or substituted by OH, a —$CH_2CH(OH)CH_2O$—$R_{15}$—$OCH_2CH(OH)CH_2$—, —CO—$R_{16}$—CO—, —CO—NH—$R_{17}$—NH—CO—or —$(CH_2)_m$—COO—$R_{18}$—OCO—$(CH_2)_m$—group, wherein m is 1-3, $R_8$ is $C_1$-$C_{18}$alkyl, $C_3$-$C_{18}$alkenyl, $C_3$-$C_{20}$alkyl which is interrupted by O, N or S and/or substituted by OH, $C_1$-$C_4$alkyl which is substituted by —$P(O)(OR_{14})_2$, —$N(R_9)(R_{10})$ or —$OCOR_{11}$ and/or OH, or is glycidyl, cyclohexyl or $C_7$-$C_{11}$phenylalkyl, $R_9$ and $R_{10}$ are each independently of the other $C_1$-$C_{12}$alkyl, $C_3$-$C_{12}$alkoxyalkyl, $C_4$-$C_{16}$dialkylaminoalkyl or $C_5$-$C_{12}$cycloalkyl, or $R_9$ and $R_{10}$, when taken together, are $C_3$-$C_9$alkylene or $C_3$-$C_9$oxaalkylene $C_3$-$C_9$azaalkylene, $R_{11}$ is $C_1$-$C_{18}$alkyl, $C_2$-$C_{18}$alkenyl or phenyl, $R_{12}$ is $C_1$-$C_{18}$alkyl, $C_2$-$C_{18}$alkenyl, phenyl, $C_1$-$C_{12}$alkoxy, phenoxy, $C_1$-$C_{12}$alkylamino, phenylamino, tolylamino or napthylamino, $R_{13}$ is $C_1$-$C_{12}$alkyl, phenyl, naphthyl or $C_7$-$C_{14}$alkylphenyl, $R_{14}$ is $C_1$-$C_{12}$alkyl or phenyl, $R_{15}$ is $C_2$-$C_{10}$alkylene, phenylene or a phenylene-X-phenylene-group, wherein X is —O—, —S—, —$SO_2$—, —$CH_2$— or —$C(CH_3)_2$—, $R_{16}$ is $C_2$-$C_{10}$alkylene, $C_2$-$C_{10}$oxaalkylene or $C_2$-$C_{10}$thiaalkylene, phenylene, naphthylene, diphenylene or $C_2$-$C_6$alkenylene, $R_{17}$ is $C_2$-$C_{10}$alkylene, phenylene, naphthylene, methylenediphenylene or $C_7$-$C_{15}$alkylphenylene, and $R_{18}$ is $C_2$-$C_{10}$alkylene or $C_4$-$C_{20}$alkylene which is interrupted by oxygen.

2. A coating composition according to claim 1, wherein the curing catalyst (component B) is a metal carboxylate or a metal chelate or an organotin compound or an amine.

3. A coating composition according to claim 2, wherein the curing catalyst is a carboxylate of a metal selected from the group consisting of Pb, Mn, Co, Zn, Zr and Cu, or is a chelate of a metal selected from the group consisting of Al, Ti or Zr, or is a tertiary amine.

4. A coating composition according to claim 1, wherein component C is a compound of formula I, wherein n is 1 or 2, $R_1$ and $R_2$ are each independently of the other H, OH or $C_1$-$C_4$alkyl, $R_3$ and $R_4$ are each independently of the other H, OH, $C_1$-$C_4$alkyl, $C_1$-$C_4$alkoxy, halogen or a radical —$OR_7$, $R_5$ and $R_6$ are each independently of the other H or $C_1$-$C_4$alkyl, $R_7$, when n is 1, is hydrogen, $C_1$-$C_{18}$alkyl, $C_1$-$C_6$alkyl which is substituted by OH, $C_1$-$C_{18}$alkoxy, phenoxy, —$COOR_8$, —$CONHR_9$, —$CON(R_9)(R_{10})$ and/or —$OCOR_{11}$, or is allyl, glycidyl or benzyl, and, when n is 2, is $C_4$-$C_{12}$alkylene, $C_4$-$C_6$alkenylene, xylylene or $C_3$-$C_{20}$alkylene which is interrupted by oxygen and/or substituted by OH, $R_8$ is $C_1$-$C_{12}$alkyl, $C_3$-$C_{18}$alkenyl, $C_3$-$C_{20}$alkyl which is interrupted by oxygen and/or substituted by OH, or $C_1$-$C_4$alkyl which is substituted by —$P(O)(OR_{14})_2$, $R_9$ and $R_{10}$ are each independently of the other $C_1$-$C_8$alkyl or cyclohexyl, or $R_9$ and $R_{10}$, when taken together, are pentamethylene or 3-oxapentamethylene, $R_{11}$ is $C_1$-$C_8$alkyl, $C_2$-$C_5$alkenyl or phenyl, and $R_{14}$ is $C_1$-$C_4$alkyl.

5. A coating composition according to claim 1, wherein component C is a compound of formula I, wherein n is 1 or 2, $R_1$ and $R_2$ are each independently of the other H or $CH_3$, $R_3$ and $R_4$ are each independently of the other H, $CH_3$ or Cl, $R_5$ and $R_6$ are hydrogen, $R_7$, when n is 1, is hydrogen, $C_1$-$C_{12}$alkyl, $C_1$-$C_4$alkyl which is substituted by OH, $C_4$-$C_{18}$alkoxy, —$COOR_8$, —$CON(R_9)(R_{10})$ and/or —$OCOR_{11}$, or is glycidyl or benzyl, and, when n is 2, is $C_6$-$C_{12}$alkylene, 2-butenyl-1,4-ene, xylylene or $C_3$-$C_{20}$alkylene which is interrupted by oxygen and/or substituted by OH, $R_8$ is $C_4$-$C_{12}$alkyl, $C_{12}$-$C_{18}$alkenyl, $C_6$-$C_{20}$alkyl which is interrupted by oxygen and/or substituted by OH, or $C_1$-$C_4$alkyl which is substituted by —$P(O)(OR_{14})_2$, $R_9$ and $R_{10}$ are $C_4$-$C_8$alkyl, $R_{11}$ is $C_1$-$C_8$alkyl or $C_2$-$C_3$alkenyl, and $R_{14}$ is $C_1$-$C_4$alkyl.

6. A coating composition according to claim 1, wherein component C is a compound of formula I, wherein n is 1 or 2 and $R_7$, when n is 1, is a —$CH_2CH(OH)CH_2O$—$R_{19}$ group, wherein $R_{19}$ is $C_1$-$C_{12}$alkyl, phenyl, phenyl which is substituted by $C_1$-$C_{12}$alkyl, $C_1$-$C_{12}$alkoxy or halogen, or is $C_3$-$C_5$alkenoyl and, when n is 2, $R_7$ is a —$CH_2CH(OH)CH_2O$—$R_{15}$—$OCH_2CH(OH)CH_2$— group, wherein $R_{15}$ is as defined in claim 1.

7. A coating composition according to claim 1 comprising, per 100 parts by weight of solid binder A, 0.01 to 20 parts by weight of curing catalyst B and 0.1 to 10 parts by weight of stabiliser C.

8. A coating composition according to claim 1 comprising, per 100 parts by weight of A, 0.05 to 5 parts by weight of B and 0.2 to 5 parts by weight of C.

9. A coating composition according to claim 1 comprising, in addition to components A, B and C, further components selected from solvents, pigments, dyes, plasticisers, stabilisers, thixotropic agents and/or levelling agents.

10. A coating composition according to claim 9 comprising, in addition to components (A), (B) and (C), a sterically hindered amine light stabilizer as component (D).

11. A coating composition according to claim 10, wherein component D is a sterically hindered amine light stabilizer which contains at least one group of formula

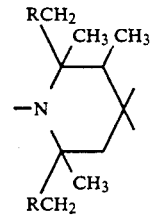

wherein R is hydrogen or methyl.

12. A cured film obtained by curing a coating composition as claimed in claim 1.

13. A method for stabilizing a coating composition which comprises a binder and at least one curing catalyst selected from the group consisting of the organic metallic compounds, amines, amino group containing resins and phosphines against the adverse effects of light, heat or oxygen, which method comprises incorporating into said coating an effective stabilizing amount of a compound of formula I according to claim 1.

14. A self-catalyzed curable coating composition comprising (A) a binder which is a system selected from
  a) a two component system based on a functional polyacrylate and a polyepoxide, said polyacrylate containing amino groups;
  b) a two component system based on a (poly)ketimine and an aliphatic or aromatic polyisocyanate;
  c) a two component system based on a (poly)ketimine and an unsaturated acrylate resin or acetoacetate resin;
  d) a two component system based on an anhydride group containing polyacrylate and a polyamine;
  e) a two component system based on a (poly)oxazolidine and an anhydride group containing polyacrylate or an unsaturated acrylate resin or polyisocyanate; or f) a two component system based on an epoxy group containing polyacrylate and an amino group containing polyacrylate; and (C) as stabiliser against damage induced by light, heat and oxygen, a compound of formula I

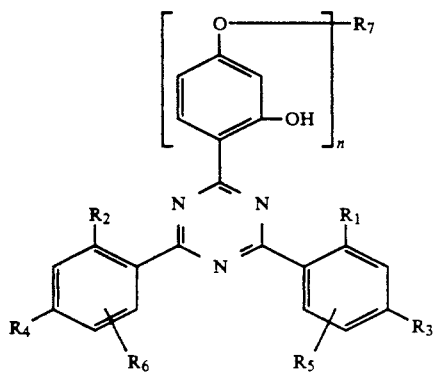

wherein n is 1 or 2, $R_1$ and $R_2$ are each independently of the other H, OH, $C_1$-$C_{12}$alkyl or halomethyl, $R_3$ and $R_4$ are each independently of the other H, OH, $C_1$-$C_{12}$alkyl, $C_1$-$C_{18}$alkoxy or halogen and, when n=1, may also be a radical —$OR_7$, $R_5$ and $R_6$ are each independently of the other H, $C_1$-$C_{12}$alkyl or halogen, $R_7$, when n is 1, is hydrogen, $C_1$-$C_{18}$alkyl or $C_1$-$C_{12}$alkyl which is substituted by OH, $C_1$-$C_{18}$alkoxy, halogen, phenoxy or phenoxy which is substituted by $C_1$-$C_{18}$alkyl, $C_1$-$C_{18}$alkoxy or halogen, —COOH, —$COOR_8$, —$CONH_2$, —$CONHR_9$, —$CON(R_9)(R_{10})$, —$NH_2$, —$NHR_9$, —$N(R_9)(R_{10})$, —$NHCOR_{11}$, —CN and/or —$OCOR_{11}$, or $R_7$ is $C_4$-$C_{20}$alkyl which is interrupted by one or more oxygen atoms and substituted by OH or $C_1$-$C_{12}$alkoxy, or is $C_3$-$C_6$alkenyl, glycidyl, $C_5$-$C_8$cycloalkyl, cyclohexyl which is substituted by OH, $C_1$-$C_4$alkyl or —$OCOR_{11}$, $C_7$-$C_{11}$phenylalkyl which is unsubstituted or substituted by OH, Cl or $CH_3$, or is —$CO$-$R_{12}$ or —$SO_2$—$R_{13}$, and, when n is 2, is $C_2$-$C_{16}$alkylene, $C_4$-$C_{12}$alkenylene, xylylene, $C_3$-$C_{20}$alkylene which is interrupted by one or more oxygen atoms and/or substituted by OH, a —$CH_2CH(OH)CH_2O$—$R_{15}$—$OCH_2CH(OH)CH_2$—, —$CO$—$R_{16}$—$CO$—, —$CO$—$NH$—$R_{17}$—$NH$—$CO$— or —$(CH_2)_m$—$COO$—$R_{18}$—$OCO$—$(CH_2)_m$— group, wherein m is 1-3, $R_8$ is $C_1$-$C_{18}$alkyl, $C_3$-$C_{18}$alkenyl, $C_3$-$C_{20}$alkyl which is interrupted by O, N or S and/or substituted by OH, $C_1$-$C_4$alkyl which is substituted by —$P(O)(OR_{14})_2$, —$N(R_9)(R_{10})$ or —$OCOR_{11}$ and/or OH, or is glycidyl, cyclohexyl or $C_7$-$C_{11}$phenylalkyl, $R_9$ and $R_{10}$ are each independently of the other $C_1$-$C_{12}$alkyl, $C_3$-$C_{12}$alkoxyalkyl, $C_4$-$C_{16}$dialkylaminoalkyl or $C_5$-$C_{12}$cycloalkyl, or $R_9$ and $R_{10}$, when taken together, are $C_3$-$C_9$alkylene or $C_3$-$C_9$oxaalkylene or $C_3$-$C_9$azaalkylene, $R_{11}$ is $C_1$-$C_{18}$alkyl, $C_2$-$C_{18}$alkenyl or phenyl, $R_{12}$ is $C_1$-$C_{18}$alkyl, $C_2$-$C_{18}$alkenyl, phenyl, $C_1$-$C_{12}$alkoxy, phenoxy, $C_1$-$C_{12}$alkylamino, phenylamino, tolylamino or naphthylamino, $R_{13}$ is $C_1$-$C_{12}$alkyl, phenyl, naphthyl or $C_7$-$C_{14}$alkylphenyl, $R_{14}$ is $C_1$-$C_{12}$alkyl or phenyl, $R_{15}$ is $C_2$-$C_{10}$alkylene, phenylene or a phenylene-X-phenylene-group, wherein X is —O—, —S—, —$SO_2$—, —$CH_2$— or —$C(CH_3)_2$—, $R_{16}$ is $C_2$-$C_{10}$alkylene, $C_2$-$C_{10}$oxaalkylene or $C_2$-$C_{10}$thiaalkylene, phenylene, naphthylene, diphenylene or $C_2$-$C_6$alkenylene, $R_{17}$ is $C_2$-$C_{10}$alkylene, phenylene, naphthylene, methylenediphenylene or $C_7$-$C_{15}$alkylphenylene, and $R_{18}$ is $C_2$-$C_{10}$alkylene or $C_4$-$C_{20}$alkylene which is interrupted by oxygen.

15. A composition according to claim 14 which additionally contains as accelerator (B) an organic metallic compound and/or an amine and/or a phosphine.

16. A composition according to claim 15 wherein the accelerator is a metal carboxylate or a metal chelate or an organotin compound or an amine.

17. A composition according to claim 16 wherein the accelerator is a carboxylate of a metal selected from the group consisting of Pb, Mn, Co. Zn, Zr and Cu, or is a chelate of a metal selected from the group consisting of Al, Ti or Zr, or is a tertiary amine.

18. A composition according to claim 14 wherein component (C) is a compound of formula I, wherein n is 1 or 2, $R_1$ and $R_2$ are each independently of the other H, OH or $C_1$-$C_4$alkyl, $R_3$ and $R_4$ are each independently of the other H, OH, $C_1$-$C_4$alkyl, $C_1$-$C_4$alkoxy, halogen or a radical —$OR_7$, $R_5$ and $R_6$ are each independently of the other H or $C_1$-$C_4$alkyl, $R_7$, when n is 1, is hydrogen, $C_1$-$C_{18}$alkyl, $C_1$-$C_6$alkyl which is substituted by OH, $C_1$-$C_{18}$alkoxy, phenoxy, —$COOR_8$, —$CONHR_9$, —$CON(R_9)(R_{10})$ and/or —$OCOR_{11}$, or is allyl, glycidyl or benzyl, and, when n is 2, is $C_4$-$C_{12}$alkylene, $C_4$-$C_6$alkenylene, xylylene or $C_3$-$C_{20}$alkylene which is interrupted by oxygen and/or substituted by OH, $R_8$ is $C_1$-$C_{12}$alkyl, $C_3$-$C_{18}$alkenyl, $C_3$-$C_{20}$alkyl which is interrupted by oxygen and/or substituted by OH, or $C_1$-$C_4$alkyl which is substituted by —$P(O)(OR_{14})_2$, $R_9$ and $R_{10}$ are each independently of the other $C_1$-$C_8$alkyl or cyclohexyl, or $R_9$ and $R_{10}$, when taken together, are pentamethylene or 3-oxapentamethylene, $R_{11}$ is $C_1$-$C_8$alkyl, $C_2$-$C_5$alkenyl or phenyl, and $R_{14}$ is $C_1$-$C_4$alkyl.

19. A composition according to claim 14 wherein component (C) is a compound of formula I wherein n is 1 or 2, $R_1$ and $R_2$ are each independently of the other H or $CH_3$, $R_3$ and $R_4$ are each independently of the other H, $CH_3$ or Cl, $R_5$ and $R_6$ are hydrogen, $R_7$, when n is 1, is hydrogen, $C_1$-$C_{12}$alkyl, $C_1$-$C_4$alkyl which is substituted by OH, $C_4$-$C_{18}$alkoxy, —$COOR_8$, —$CON(R_9)(R_{10})$ and/or —$OCOR_{11}$, or is glycidyl or benzyl, and, when n is 2, is $C_6$-$C_1$-

2alkylene, 2-butenyl-1,4-ene, xylylene or $C_3$-$C_{20}$alkylene which is interrupted by oxygen and/or substituted by OH, $R_8$ is $C_4$-$C_{12}$alkyl, $C_{12}$-$C_{18}$alkenyl, $C_6$-$C_{20}$alkyl which is interrupted by oxygen and/or substituted by OH, or is $C_1$-$C_4$alkyl which is substituted by —P(O)(OR$_{14}$)$_2$, $R_9$ and $R_{10}$ are $C_4$-$C_8$alkyl, $R_{11}$ is $C_1$-$C_8$alkyl or $C_2$-$C_3$alkenyl, and $R_{14}$ is $C_1$-$C_4$alkyl.

20. A composition according to claim 14 component (C) is a compound of formula I, wherein n is 1 or 2, and $R_7$, when n is 1, is a —CH$_2$CH(OH)CH$_2$O—R$_{19}$ group, wherein $R_{19}$ is $C_1$-$C_{12}$alkyl, phenyl, phenyl which is substituted by $C_1$-$C_{12}$alkyl, $C_1$-$C_{12}$alkoxy or halogen, or is $C_3$-$C_5$alkenoyl and, when n is 2, $R_7$ is a —CH$_2$CH(OH)CH$_2$O—R$_{15}$—OCH$_2$CH(OH)CH$_2$— group, wherein $R_{15}$ is as defined in claim 20.

21. A composition according to claim 15 comprising, per 100 parts by weight of solid binder (A), 0.01 to 20 parts by weight of accelerator (B) and 0.1 to 10 parts by weight of stabilizer (C).

22. A composition according to claim 15 comprising, per 100 parts by weight of (A), 0.05 to 5 parts by weight of (B) and 0.2 to 5 parts by weight of (C).

23. A composition according to claim 14 comprising, in addition to components (A), (B) and (C), further components selected from solvents, pigments, dyes, plasticisers, stabilisers, thixotropic agents and/or levelling agents.

24. A composition according to claim 23 comprising, in addition to components (A), (B) and (C), a sterically hindered amine light stabilizer as component (D).

25. A composition according to claim 24 wherein component (D) is a sterically hindered amine light stabilizer which contains at least one group of formula

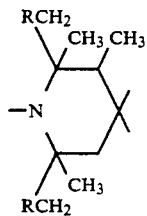

wherein R is hydrogen or methyl.

26. A cured film obtained by curing a coating composition as claimed in claim 14.

27. A method for stabilizing a coating composition which comprises a binder and at least one accelerator selected from the group consisting of the organic metallic compounds, amines, and phosphines against the adverse effects of light, heat or oxygen, which method comprises incorporating into said coating an effective stabilizing amount of a compound of formula I according to claim 14.

28. A curable coating composition, comprising:
(A) a binder which is
(i) a functional acrylate resin and a crosslinker;
(ii) an acrylate copolymer containing alkoxysilane or alkoxysilane side groups;
(iii) a two component system based on a hydroxyl group containing polyacrylate and/or polyester and an aliphatic or aromatic polyisocyanate;
(iv) a two component system based on a functional polyacrylate and polyepoxide, said polyacrylate containing carboxyl or anhydride groups;
(v) a two component system based on a fluoromodified or silicon-modified hydroxyl group containing polyacrylate or polyester and an aliphatic or aromatic polyisocyanate;
(vi) a two component system based on a (poly)ketimine and a methyl-α-acrylamidomethyl glycolate;
(vii) a two component system based on an epoxy group containing polyacrylate and a carboxyl group containing polyacrylate;
(viii) an air-drying alkyd, acrylic or alkydacrylic resin; or
(ix) a polymer based on allyl glycidyl ether;
(B) as curing catalyst, an organic metallic compound and/or amine and/or an amino group containing resin and/or a phosphine;
(C) as stabiliser against damage induced by light, heat and oxygen, a compound of formula I

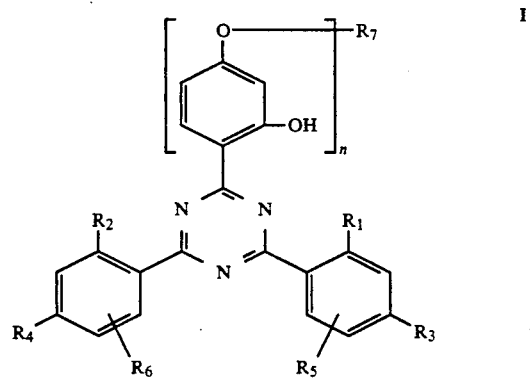

wherein n is 1 or 2,
$R_1$ and $R_2$ are each independently of the other, H, OH, $C_1$-$C_{12}$alkyl or halomethyl,
$R_3$ and $R_4$ are each independently of the other, H, OH, $C_1$-$C_{12}$alkyl, $C_1$-$C_{18}$alkoxy or halogen and, when n=1, may also be a radical —OR$_7$,
$R_5$ and $R_6$ are each independently of the other, H, $C_1$-$C_{12}$alkyl or halogen,
$R_7$, when n is 1, is hydrogen, $C_1$-$C_{18}$alkyl or $C_1$-$C_{12}$alkyl which is substituted by OH, $C_1$-$C_{18}$alkoxy, halogen, phenoxy, or phenoxy which is substituted by $C_1$-$C_{18}$alkyl, $C_1$-$C_{18}$alkoxy or halogen, —COOH, —COOR$_8$, CONH$_2$, —CONHR$_9$, —CON(R$_9$) (R$_{10}$), —NH$_2$, —NHR$_9$, —N(R$_9$) (R$_{10}$), —NHCOR$_{11}$, —CN and/or —OCOR$_{11}$, or $R_7$ is $C_4$-$C_{20}$alkyl which in interrupted by one or more oxygen atoms and substituted by OH or $C_1$-$C_{12}$alkoxy, or is $C_3$-$C_6$alkenyl, glycidyl, $C_5$-$C_8$cycloalkyl, cyclohexyl which is substituted by OH, $C_1$-$C_4$alkyl or —OCOR$_{11}$, $C_7$-$C_{11}$phenylalkyl which is unsubstituted or substituted by OH, Cl, or CH$_3$, or is —CO—R$_{12}$ or —SO$_2$—R$_{13}$, and, when n is 2, is $C_2$-$C_{16}$ alkylene, $C_4$-$C_{12}$ alkenylene, xylylene, $C_3$-$C_{20}$ alkylene which is interrupted by one or more oxygen atoms and/or substituted by OH, a —CH$_2$CH(OH)CH$_2$O—R$_{15}$—OCH$_2$CH(OH)CH$_2$—, —CO—R$_{16}$—CO—, —CO—NH—R$_{17}$—NH—CO— or (CH$_2$)$_m$—COO—R$_{18}$—OCO—(CH$_2$)$_m$— group, wherein m is 1-3, $R_8$ is $C_1-C_{18}$ alkyl, $C_3-C_{18}$ alkenyl, $C_3-C_{20}$ alkyl which is interrupted by O, N, or S, and/or substituted by OH, $C_1-C_4$ alkyl which is substituted by —P(O) $(OR_{14})_2$, —N($R_9$) ($R_{10}$), or —OCOR$_{11}$, and/or OH, or is glycidyl, cyclohexyl or $C_7-C_{11}$ phenylalkyl, $R_9$ and $R_{10}$ are each independently of the other, $C_1-C_{12}$alkyl, $C_3-C_{12}$alkoxyalkyl, $C_4-C_{16}$dialkylaminoalkyl or $C_5-C_{12}$cycloalkyl, or $R_9$ and $R_{10}$, when taken together, are $C_3-C_9$alkylene or $C_3-C_9$oxaalkylene or $C_3-C_9$azaalkylene, $R_{11}$ is $C_1-C_{18}$alkyl, $C_2-C_{18}$alkenyl or phenyl, $R_{12}$ is $C_1-C_{18}$alkyl, $C_2-C_{18}$alkenyl, phenyl, $C_1-C_{12}$alkoxy, phenoxy, $C_1-C_{12}$alkylamino, phenylamino, tolylamino or naphthylamino, $R_{13}$ is $C_1-C_{12}$alkyl, phenyl, naphthyl or $C_7-C_{14}$alkylphenyl, $R_{14}$ is $C_1-C_{12}$alkyl or phenyl, $R_{15}$ is $C_2-C_{10}$alkylene phenylene or a phenylene-x-phenylene- group, wherein X is —O—, —S—, —SO$_2$—, —CH$_2$—, or —C(CH$_3$)$_2$—, $R_{16}$ is $C_2-C_{10}$alkylene, $C_2-C_{100}$oxaalkylene or $C_2-C_{10}$thiaalkylene, phenylene, naphthylene, diphenylene or $C_2-C_6$alkenylene, $R_{17}$ is $C_2-C_{10}$alkylene, phenylene, naphthylene, methylenediphenylene or $C_7-C_{15}$alkylphenylene, and $R_{18}$ is $C_2-C_{10}$alkylene or $C_4-C_{20}$alkylene which is interrupted by oxygen; and (D) from 0.05 to 5 parts by weight of a sterically hindered amine light stabilizer per 100 parts by weight of the binder.

29. A self-catalyzed curable coating composition, comprising:

(A) a binder which is a system selected from:
(i) a two component system based on a functional polyacrylate and polyepoxide, said polyacrylate containing amino groups;
(ii) a two component system based on a (poly)ketimine and an aliphatic or aromatic polyisocyanate;
(iii) a two component system based on a (poly)ketimine and an unsaturated acrylate resin or acetoacetate resin;
(iv) a two component system based on an anhydride group containing polyacrylate and polyamine;
(v) a two component system based on a (poly)oxazolidine and an anhydride group containing polyacrylate or an unsaturated acrylate resin or polyisocyanate;
(vi) a two component system based on an epoxy group containing polyacrylate and an amino group containing polyacrylate;

(B) an organic metallic compound and/or amine and/or phosphine as an accelerator;

(C) as stabiliser against damage induced by light, heat and oxygen, a compound of formula I

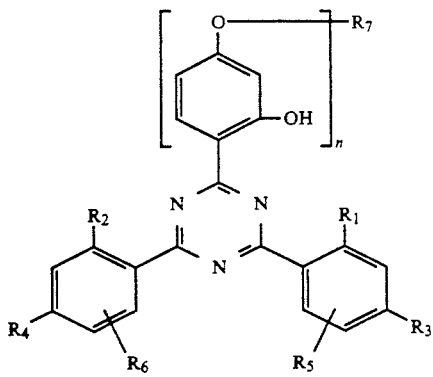

wherein n is 1 or 2, $R_1$ and $R_2$ are each independently of the other, H, OH, $C_1-C_{12}$alkyl or halomethyl, $R_3$ and $R_4$ are each independently of the other, H, OH, $C_1-C_{12}$alkyl, $C_1-C_{18}$alkoxy or halogen and, when n=1, may also be a radical —OR$_7$, $R_5$ and $R_6$ are each independently of the other, H, $C_1-C_{12}$alkyl or halogen, $R_7$, when n is 1, is hydrogen, $C_1-C_{18}$alkyl or $C_1-C_{12}$alkyl which is substituted by OH, $C_1-C_{18}$alkoxy, halogen, phenoxy, or phenoxy which is substituted by $C_1-C_{18}$alkyl, $C_1-C_{18}$alkoxy or halogen, —COOH, —COOR$_8$, CONH$_2$, —CONHR$_9$, —CON(R$_9$) (R$_{10}$), —NH$_2$, —NHR$_9$, —N(R$_9$) (R$_{10}$), —NHCOR$_{11}$, —CN and/or —OCOR$_{11}$, or $R_7$ is $C_4-C_{20}$alkyl which in interrupted by one or more oxygen atoms and substituted by OH or $C_1-C_{12}$alkoxy, or is $C_3-C_6$alkenyl, glycidyl, $C_5-C_8$cycloalkyl, cyclohexyl which is substituted by OH, $C_1-C_4$alkyl or —O-COR$_{11}$, $C_7-C_{11}$phenylalkyl which is unsubstituted or substituted by OH, Cl, or CH$_3$, or is —CO—R$_{12}$ or —SO$_2$—R$_{13}$, and, when n is 2, is $C_2-C_{16}$ alkylene, $C_4-C_{12}$ alkenylene, xylylene, $C_3-C_{20}$ alkylene which is interrupted by one or more oxygen atoms and/or substituted by OH, a —CH$_2$CH(OH) CH$_2$O—R$_{15}$—OCH$_2$CH(OH)CH$_2$—, —CO—R$_{16}$—CO—, —CO—NH—R$_{17}$—NH—CO— or (CH$_2$)$_m$—COO—R$_{18}$—OCO—(CH$_2$)$_m$—group, wherein m is 1-3, $R_8$ is $C_1-C_{18}$ alkyl, $C_3-C_{18}$ alkenyl, $C_3-C_{20}$ alkyl which is interrupted by O, N, or S, and/or substituted by OH, $C_1-C_4$ alkyl which is substituted by —P(O) $(OR_{14})_2$, —N($R_9$) ($R_{10}$), or —OCOR$_{11}$, and/or OH, or is glycidyl, cyclonexyl or $C_7-C_{11}$ phenylalkyl, $R_9$ and $R_{10}$ are each independently of the other, $C_1-C_{12}$alkyl, $C_3-C_{12}$alkoxyalkyl, $C_4-C_{16}$dialkylaminoalkyl or $C_5-C_{12}$ cycloalkyl, or $R_9$ and $R_{10}$, when taken together, are $C_3-C_9$alkylene or $C_3-C_9$oxaalkylene or $C_3-C_9$azaalkylene, $R_{11}$ is $C_1-C_{18}$alkyl, $C_2-C_{18}$alkenyl or phenyl, $R_{12}$ is $C_1-C_{18}$alkyl, $C_2-C_{18}$alkenyl, phenyl, $C_1-C_{12}$alkoxy, phenoxy, $C_1-C_{12}$alkylamino, phenylamino, tolylamino or naphthylamino, $R_{13}$ is $C_1-C_{12}$alkyl, phenyl, naphthyl or $C_7-C_{14}$alkylphenyl, $R_{14}$ is $C_1-C_{12}$alkyl or phenyl, $R_{15}$ is $C_2-C_{10}$alkylene phenylene or a phenylene-X-phenylene-group, wherein X is —O—, —S—, —SO$_2$—, —CH$_2$—, or —C(CH$_3$)$_2$—, $R_{16}$ is $C_2-C_{10}$alkylene, $C_2-C_{100}$oxaalkylene or $C_2-C_{10}$thiaalkylene, phenylene, naphthylene, diphenylene or $C_2-C_6$alkenylene, $R_{17}$ is $C_2-C_{10}$alkylene, phenylene, naphthylene, methylenediphenylene or $C_7-C_{15}$alkylphenylene, and $R_{18}$ is $C_2-C_{10}$alkylene or $C_4-C_{20}$alkylene which is interrupted by oxygen; and (D) from 0.05 to 5 parts by weight of a sterically hindered amine light stabiliscr per 100 parts by weight of the binder.

* * * * *